(12) United States Patent
Barbosa et al.

(10) Patent No.: US 7,308,974 B2
(45) Date of Patent: Dec. 18, 2007

(54) DISC BRAKE HAVING IMPROVED PAD CLIP AND PAD RETURN SPRING

(75) Inventors: Manuel Barbosa, Novi, MI (US); Eric John Roszman, Farmington Hills, MI (US); Muhammed Farooq Ansari, Farmington Hills, MI (US)

(73) Assignee: Akebono Corporation (North America), Elizabethtown, KY (US)

( * ) Notice: Subject to any disclaimer, the term of this patent is extended or adjusted under 35 U.S.C. 154(b) by 28 days.

(21) Appl. No.: 10/494,049

(22) PCT Filed: Jun. 30, 2003

(86) PCT No.: PCT/US03/20416

§ 371 (c)(1),
(2), (4) Date: Apr. 29, 2004

(87) PCT Pub. No.: WO2004/003398

PCT Pub. Date: Jan. 8, 2004

(65) Prior Publication Data

US 2004/0256183 A1   Dec. 23, 2004

Related U.S. Application Data

(60) Provisional application No. 60/391,968, filed on Jun. 28, 2002.

(51) Int. Cl.
*F16D 55/224* (2006.01)
*F16D 65/40* (2006.01)

(52) U.S. Cl. .................................. 188/72.3; 188/73.38
(58) Field of Classification Search ............... 188/72.3, 188/73.38
See application file for complete search history.

(56) References Cited

U.S. PATENT DOCUMENTS

| 3,719,257 | A | | 3/1973 | Maurice |
| 3,863,038 | A | * | 1/1975 | Kreitner et al. ............ 188/72.3 |
| 4,362,227 | A | * | 12/1982 | Walton et al. ............. 188/72.3 |
| 5,109,959 | A | | 5/1992 | Kondo et al. |
| 5,249,647 | A | * | 10/1993 | Kobayashi et al. ........ 188/72.3 |
| 5,687,817 | A | * | 11/1997 | Kobayashi et al. ........ 188/72.3 |
| 5,934,417 | A | * | 8/1999 | Kobayashi et al. ...... 188/73.38 |
| 6,378,665 | B1 | * | 4/2002 | McCormick et al. .... 188/73.38 |
| 6,719,105 | B1 | * | 4/2004 | Wemple .................. 188/73.38 |

* cited by examiner

*Primary Examiner*—Devon C. Kramer
*Assistant Examiner*—Kochi Rashid
(74) *Attorney, Agent, or Firm*—Dobrusin & Thennisch PC

(57) ABSTRACT

A pad clip (12) for a disc brake includes a first part configured to engage a brake pad support bracket (2). The clip further includes a spring leg that is positioned to engage the brake pad (4) and apply a force to the brake pad that generates an axial friction force on the brake pad. The clip has a support for receiving a pad return spring (18) and the support for the pad return spring is positioned so that it holds the pad return spring such that the pad return spring applies a return force that is in substantial alignment with the axial friction force. The disc brake is further arranged so that the center of gravity of the brake pads lies between the pad abutment force and the axial friction force.

19 Claims, 3 Drawing Sheets

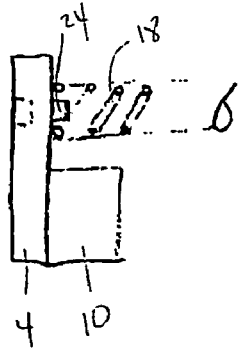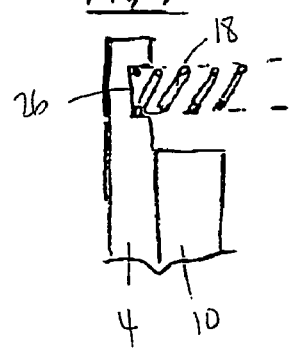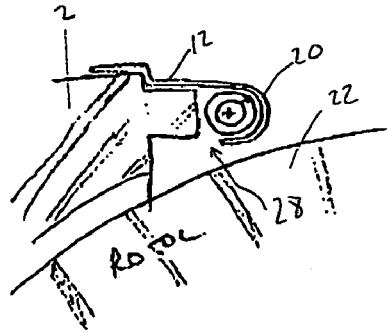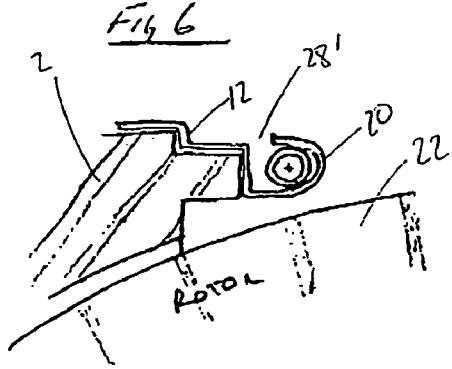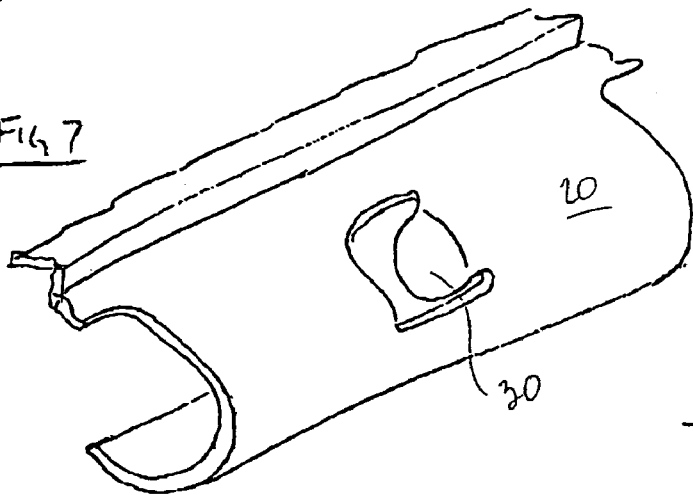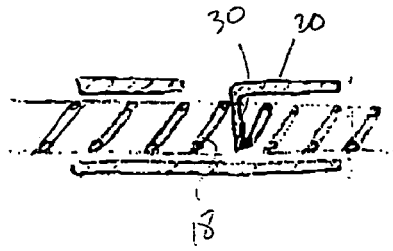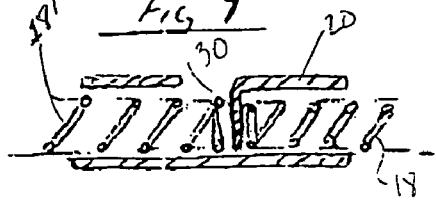

DISC BRAKE HAVING IMPROVED PAD CLIP AND PAD RETURN SPRING

This application is a national stage of PCT/US03/020416 pursuant to 35 USC §371, having an international filing date of Jun. 30, 2003, and claims the benefit of U.S. Provisional Application 60/391,968, which was filed on Jun. 28, 2002.

TECHNICAL FIELD

This invention relates to the art of disc brakes. In particular, the invention relates to the art of structures used to generate forces to control the motion of brake pads and to support return springs in disc brakes.

BACKGROUND ART

Disc brakes typically employ one or more springs to urge the disc brake pads away from each other when braking pressure is released to avoid drag on the rotor. Many different shapes have been used for these springs, and a typical spring is a V-shaped wire that attaches to the top of the pad plate. This spring is nested between the caliper body bridge and the rotor. The V-spring attachment requires a small hole to be drilled into the edge of the pad plate, which is a costly operation. The wire form V-spring itself is expensive because it requires the wire to be bent at different angles and in different shapes.

In many applications the pad abutments are below the V-spring attachment to the pad. In these cases, the function force between the pad abutment and pad clips prevent the pad from moving away from the rotor in parallel fashion. Typically the top of the pad moves away while the bottom of the pad remains in contact with the rotor.

In many instances, the V-spring is trapped between the pad and the underside of the caliper bridge. The spring legs must be sufficiently long to remain engaged with the pad in all cases of pad to bridge gap tolerance. In many cases the V-spring will rub against the underside of the caliper bridge with a force large enough to cause the spring wire to wear or to cause the caliper body slide force to increase.

SUMMARY OF THE INVENTION

In accordance with the invention, a pad return spring comprises a spring, preferably a coiled spring, that is held on the brake support bracket by a pad clip. The pad clip attaches to the support bracket and includes a rail that engages the pads for movement during braking actions. The pad clip also includes a spring leg that applies a force to the top of the pads to prevent rattle. The force applied by the spring leg generates frictional forces on the pad between the spring leg and the rail, and the return spring is positioned near this frictional force to approximately align the force applied by the return spring with the frictional forces and thereby prevent the pad from tilting by application of these forces.

Preferably the return spring is coiled and tubular, and the pad clip includes a portion that receives the coiled spring to position it above the rotor. This location and shape reduce spring wear and help prevent buckling of the spring. The portion of the pad clip that receives the coiled spring is preferably tubular with a longitudinal opening on one side to prevent accumulation of debris and allow proper water drainage. The open side may be oriented, e.g., upward or downward depending on the caliper design and packaging.

The pads themselves may include structure to help in positively locating the end of the spring on the pad. This may be a dimple that receives the end of a coiled spring or a protrusion engaged in the end of the spring.

The pad clip may include an anchor for the spring that is centrally located with respect to the pad movement. This allows the spring to be anchored to the clip such that the outward forces on the pads are produced relative to a defined position on the support bracket and not relative to the other pad. As well, this allows either the use of a single return spring or two separate return springs. The use of two return springs allows two distinct return spring forces, which may be necessary for proper caliper function.

Accordingly, it is an object of this invention to provide a unique pad clip that supports a return spring for applying selected forces to disc brake pads to return them to rest positions upon relaxation of braking forces.

It is a further object of the invention to provide a unique pad clip in combination with a coiled return spring that engages disc brake pads and urges the pads away from a disc brake rotor.

BRIEF DESCRIPTION OF THE DRAWINGS

FIGS. 3 and 4 are partial side views showing the engagement between a coiled return spring and a brake pad.

FIGS. 5 and 6 show alternate designs for the pad clip.

FIG. 7 is a partial perspective view of a pad clip in accordance with the invention showing the portion that supports the return spring.

FIGS. 8 and 9 are partial cross sections of the pad clip shown alternate methods of engaging a return spring.

DETAILED DESCRIPTION OF THE PREFERRED EMBODIMENTS

Figure 1:
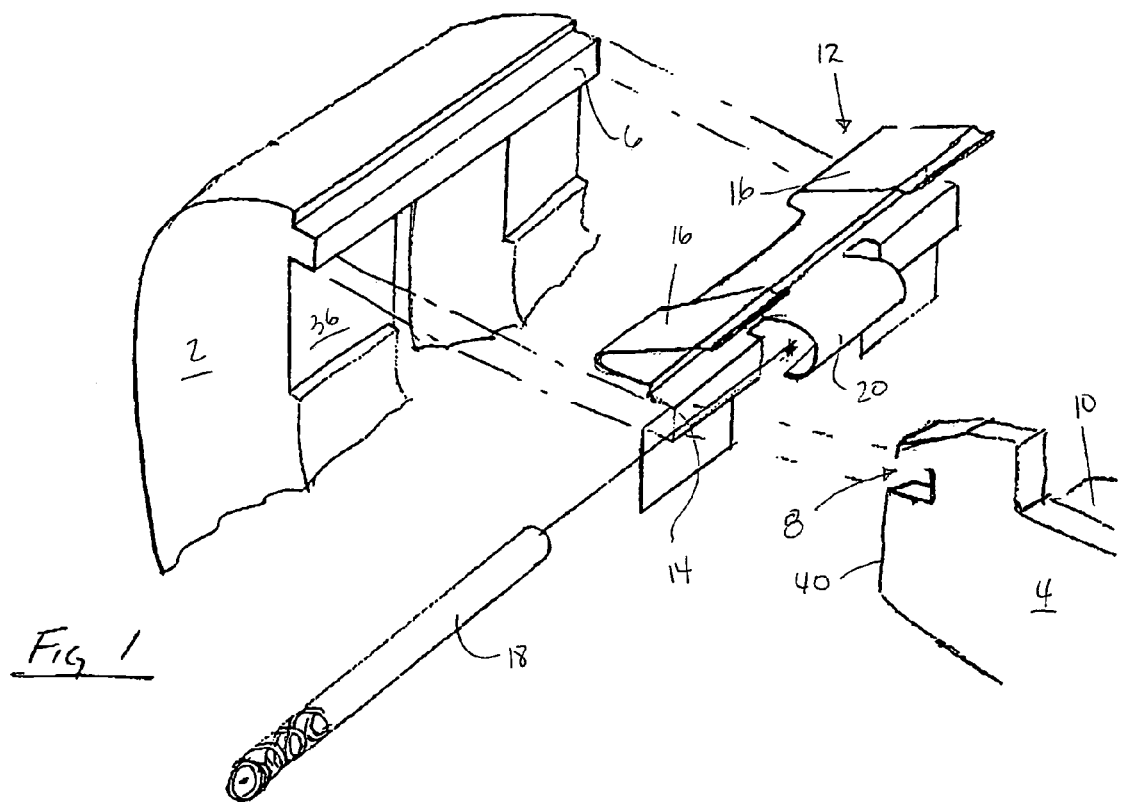
FIG. 1 is an exploded view showing a disc brake system with a pad clip and return spring according to the invention.

With reference to the FIG. 1 of the drawings, a disc brake includes a support bracket 2 that carries brake pads 4, as is known in the art. Only one of the pads is shown in FIG. 1, but it is understood that disc brakes generally include two such pads. The support bracket may include a rail 6 that engages a groove 8 in each pad to support the pads on the bracket. Each pad includes a friction brake material 10 attached to the face of the pad for engaging a brake rotor (see FIG. 2) during braking.

A pad clip 12 in accordance with the invention includes several features whereby it can be placed on the support bracket to prevent rattle of the pads and to support a return spring in an advantageous position. The preferred pad clip shown in FIG. 1 is made of relatively thin metal (e.g. steel) and is formed to provide a clip rail 14 that conforms to the shape of the rail 6 so that the clip fits easily onto the support bracket 2. If the support bracket were to have a feature other than the rail 6 as shown, then the clip would be designed to cooperate with that feature. As well, of course, the clip could be designed to fit on the support bracket shown without engaging the rail 6.

The pad clip provides a spring leg 16 that is configured to engage the tops of the brake pads and apply a downward force on the pads to prevent rattle of the brake pads. The spring leg is shown as comprising two spaced parts, but it will be appreciated that it could be a continuous part extending across the entire clip or only a portion thereof, or several distinct, spaced parts.

The pad clip 12 includes structure for supporting a pad return spring 18. In the preferred embodiment, the return spring 18 is a coiled spring, which provides a force in the axial direction (e.g., the direction of movement of the pads) urging the pads to a rest position. The preferred support structure comprises a tubular support 20 that extends outwardly from the clip rail 14 and generally adjacent the clip rail 14. The pad clip is preferably formed of thin metal, and the tubular support is formed by a curved flap of the metal, the flap being attached to the remainder of the clip.

The tubular support is arranged to position the spring 18 between the drake pads 4 such that the force applied by the spring to the pads is aligned with the frictional forces on the pad that are applied to the groove 8. These frictional forces arise between the groove 8 and the clip rail 14 as a result of the downward force applied by the spring leg 16. A frictional force also arises between the spring leg and the top of the pad where it engages the spring leg. Thus, there are frictional forces applied to the top of the pad and to the groove that are overcome by the spring 18 when brake pressure is relaxed. By positioning the spring between these forces, there is no net torque arising from the forces that would tend to rotate the pad and cause it to bind up.

Figure 2:
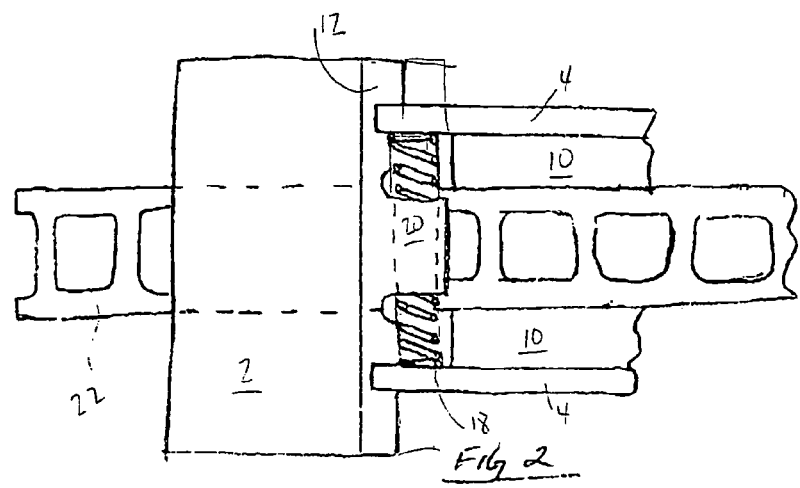
FIG. 2 is a partial top plan view of a portion of a disc brake system showing the pad clip and return spring of the invention assembled.

FIG. 2 illustrates how the clip is attached to the support bracket 2 with the brake pads 4 on opposite sides of the rotor 22.

FIGS. 3 and 4 illustrate a feature of the invention whereby the brake pads are configured to include a feature that engages the return spring. In FIG. 3, that feature is a protrusion 24 that engages a central opening in the return spring. In FIG. 4, the feature is a depression, or hollow, 26 that receives the end of the spring.

FIGS. 5 and 6 show alternate embodiments of the tubular support 20. In FIG. 5, the tubular support 20 includes a longitudinal opening 28 on the bottom of the tubular support. This opening allows water to drain and debris to drop out. It will be appreciated that the location of the longitudinal opening depends on the ultimate orientation of the support bracket and the overall configuration of the brake. Thus, FIG. 6 shows an embodiment wherein the longitudinal opening 28' is at the top of the pad clip. As well, the opening 28 need not extend the entire length of the tubular support and may include other features, such as a screen or the like to prevent entry of debris while allowing water to drain.

In accordance with a further feature of the invention, the return spring can be attached to the support 20 such that the forces applied by the return spring are controlled. In the embodiment shown in FIG. 7, the support 20 is provided with a tab 30 that engages the return spring as illustrated in FIGS. 8 and 9. The tab is conveniently formed of the sidewall of the tubular support, but may be formed in other ways or be a separate element. Engagement between the tab 30 and the return spring 18 (or springs) causes the force applied by the spring to be applied to the pad clip, as opposed to the other pad. Thus, in the embodiments shown in FIGS. 7, 8, and 9, the spring applies a force to a respective pad at one end and to the tab 30 on the pad clip at the other. This allows the forces applied to the pads to be predetermined. In some cases, it may be desirable for the forces to be equal, but in other cases it is desirable for the forces to be different. Either situation can be addressed by appropriately setting the length or spring characteristics of the return spring or springs.

FIG. 8 illustrates a configuration wherein the tab 30 engages an intermediate part of the return spring 18, as by engaging a portion of the helical coils. FIG. 9 illustrates an alternate embodiment wherein two separate springs, 18 and 18' are utilized. In the embodiment of FIG. 8, the axial location of the coil engaged by the tab determines the relative strengths of the two parts, and in the embodiment of FIG. 9 the respective characteristics of each of the springs will determine the relative strengths. This allows the forces applied to the pads to be predetermined.

It will be appreciated that the pad clip 12 may be used without the return spring. In one use, the pad clip is provided whereby the spring leg 16 applies a force as discussed above to prevent rattle but the return spring is not used. The tubular support 20, however, acts as a stop for the two brake pads and limits their movement toward each other. This has the advantage of maintaining the separation of the pads during shipment, which facilitates final assembly of the brake system because it facilitates placement of the sub-assembly onto the rotor. This avoids the necessity of placing a dummy rotor between the pads during shipment and the step of removing the dummy rotor at the final assembly location.

Figure 10:
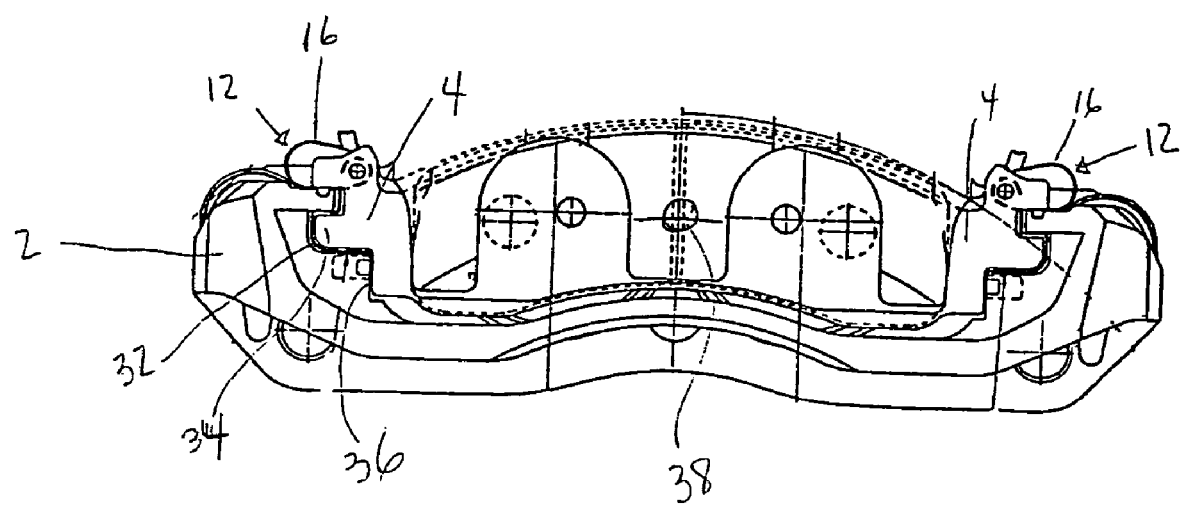
FIG. 10 is a partial side view of a disc brake showing a second embodiment of the inventive pad clip.

FIG. 10 shows another embodiment of the pad clip 12. In this embodiment, the use of the return spring 18 is optional because the primary function of the pad clip is to apply a downward (in the direction of FIG. 10) force that urges the pad toward the support bracket 2. That force generates an axial friction force, as discussed above, between the spring leg 16 and the top of the pad and between the pad groove or projection and the clip rail or channel. It will be appreciated that the design of the support bracket shown in FIG. 10 utilizes a channel 32 instead of a rail and that the pad 4 utilizes a projection 34 that engages in the channel 32. In this design, the force on the brake pad generated during braking operations is applied at a surface 36 of the support bracket 2. Thus, the brake pad has a complementary surface 40 (see FIG. 1) that engages surface 36 whereby the pad abutment force is applied at 36.

It will be appreciated that in this embodiment the pad abutment force is resisted at a location substantially below the center of gravity of the brake pad 4, which is indicated by the circle at 38. Further, the frictional force applied by the spring leg to the top of the brake pad is near or somewhat above the center of gravity 38. To prevent tilting of the brake pad during non-braking, it is desirable for the structure to provide that the frictional forces generated by the pad clip on the brake pad are applied at approximately the level of the center of gravity of the brake pad or above the level of the center of gravity by no more than twenty-five percent (25%) of the average height of the pad. This construction substantially reduces the tilt of the pad during non-braking by reducing the torque tending to tilt the pad about a tangential axis resulting from the radial separation of forces resulting from inertia of the pad during movement of the vehicle in the non-braking condition and the frictional resistance to movement applied by the pad clip. (Note that radial and tangential directions are determined with reference to the rotor and the axial direction is the direction of the wheel axle.)

The design shown in FIG. 10 is particularly advantageous because the abutment forces applied in the tangential direction during braking are below the center of gravity of the brake pad, while the frictional forces generated by the pad clip in the axial direction are at or slightly above the center of gravity of the brake pad. This distribution of the forces has been found to be highly advantageous. The reduce pad tilt substantially, which reduces brake jutter.

Modification within the scope of the appended claims will be apparent to those of skill in the art.

We claim:

1. A pad clip comprising a portion adapted to engage a brake pad support bracket, an elongate clip rail configured to engage a brake pad and guide said brake pad in an axial direction, a spring leg positioned above said clip rail and configured to engage a brake pad and apply a force to said brake pad to generate an axial frictional force on said brake pad between said brake pad and said clip rail, and a support for a pad return spring, wherein the support for the pad return spring is positioned horizontally adjacent said clip rail with respect to said brake pad support bracket and includes an opening for receiving said pad return spring within said support, where said support is positioned below the engagement between said spring leg and said brake pad to hold a pad return spring such that the pad return spring applies a return force to said brake pad in substantial alignment with said axial friction force.

2. A pad clip according to claim 1 wherein said support for a pad return spring comprises a tubular component extending in the axial direction.

3. A pad clip according to claim 1 made of folded metal.

4. A pad clip according to claim 1 further comprising a pad return spring engaged in said support and extending in said axial direction.

5. A pad clip wherein said pad return spring comprises a coiled spring.

6. A pad clip wherein said support includes means for restricting the axial movement of said pad return spring.

7. A pad clip wherein said support comprises a tubular element forming a cavity receiving said pad return spring and said means for restricting comprises a tab extending into said cavity.

8. A pad clip wherein said pad return spring comprises at least two coiled springs.

9. A pad clip comprising a first portion adapted to engage a brake pad support bracket, an elongate clip rail configured to engage opposed brake pads and to guide said brake pads for motion in an axial direction, a spring leg positioned to engage said brake pads and apply a force to said brake pads to generate an axial frictional force on said brake pads between said brake pads and said clip rail, and a second portion positioned adjacent said clip rail and configured to extend axially between said opposed brake pads to maintain a minimum separation of said brake pads by engagement with said brake pads, wherein said second portion is located below the engagement between said spring leg and said brake pads.

10. A pad clip according to claim 9 wherein said second portion comprises a support for a pad return spring.

11. A pad clip according to claim 10 in further combination with said pad return spring.

12. A pad clip wherein said pad return spring comprises a tubular coiled spring extending in said axial direction.

13. A disc brake comprising a support bracket, at least one brake pad having a center of gravity, and a pad clip, wherein said support bracket comprises means for receiving a pad abutment force, said means for receiving being displaced from said center of gravity in a radial direction, and said pad clip applies a force to said brake pad that generates an axial frictional force aligned with said center of gravity or displaced therefrom in a radial direction opposite that of said means for receiving by a distance that is less than twenty five percent of the height of the brake pad, wherein said pad abutment force is radially spaced from the axial frictional force and is located below the center of gravity.

14. A disc brake according to claim 13 wherein said pad clip further comprises a support for a pad return spring, wherein said support is located below said axial friction force.

15. A disc brake according to claim 14 wherein said support is configured to support the pad return spring in a position such that it applies a pad return force in substantial alignment with said axial friction force.

16. A disc brake according to claim 15 wherein said support is a tubular element forming a cavity for receiving said pad return spring.

17. A disc brake according to claim 13 wherein said pad clip includes means between opposed brake pads for limiting the movement of said pads toward each other.

18. A disc brake wherein said support comprises a tubular element forming a cavity receiving said pad return spring and said means for restricting comprises a tab extending into said cavity.

19. A disc brake wherein said pad return spring comprises at least two coiled springs.

* * * * *

UNITED STATES PATENT AND TRADEMARK OFFICE
CERTIFICATE OF CORRECTION

PATENT NO. : 7,308,974 B2  Page 1 of 1
APPLICATION NO. : 10/494049
DATED : December 18, 2007
INVENTOR(S) : Manuel Barbosa et al.

It is certified that error appears in the above-identified patent and that said Letters Patent is hereby corrected as shown below:

On title page, item 56 References Cited,
Please add the following references
3,349,871
4,364,455
4,527,669
5,069,313
5,310,024
5,511,638
5,515,951
4,276,965
EP 0747609

Signed and Sealed this

Seventh Day of October, 2008

JON W. DUDAS
*Director of the United States Patent and Trademark Office*